United States Patent Office.

JOSEPH W. BITNER, OF DOWNESVILLE, MARYLAND.

Letters Patent No. 71,689, dated December 3, 1867.

IMPROVEMENT IN FERTILIZERS.

The Schedule referred to in these Letters Patent and making part of the same.

TO ALL WHOM IT MAY CONCERN:

Be it known that I, JOSEPH W. BITNER, of Downesville, in the county of Washington, and State of Maryland, have invented a new and useful Improvement in Fertilizers; and I do hereby declare that the following is a full and exact description thereof.

It is well known that farmers lose a large percentage of the fertilizing ingredients of barn-yard manure, even under the most approved treatment heretofore known, and the object of my invention is to produce a more valuable fertilizer from such manure, and to present the same in an improved condition for use.

My invention consists of a new process of treating the manures of various domestic animals, and especially of the cow, horse, and sheep, for the purpose of increasing their value as fertilizers, and bringing them into a proper state for sowing by a guano-attachment to grain-drills, and also in the new fertilizer thus prepared.

In the manufacture or preparation of my improved fertilizer, the manure from cows, horses, sheep, and other animals is collected into large piles, and covered with earth, in order to hasten the chemical decomposition or rotting of the same. The covering of earth will more or less protect the pile from drenching rains, which are liable to wash away the more soluble salts of ammonia and the nitrate of potash formed within the mass, and it will also absorb and retain in permanent form much of the ammonia which might otherwise escape and be lost. Care must be taken, especially with horse-manure, not to let the chemical action of decomposition run too high, and thus heat or "burn the manure." To prevent this, the earth or soil may be more or less mixed with the manure, and a thicker covering employed. Also, water, or what is better, the wash of the yard, may be poured upon the manure pile from time to time, and holes may be made therein by thrusting in a stick, thus enabling the water to flow into the middle of the heap, and cool down the temperature. These additions of earth and liquid manure will increase the quantity of manure when rotted, without injuring its quality. But an excess of water must not be used, as such excess will leach the manure and wash away valuable ingredients, as above mentioned.

The main object to be kept in view is to produce a damp rot, avoiding the extremes of wet and dry, to keep the mass in such condition that the air will be absorbed, and thus facilitate the formation of ammonia and nitric acid, both of gaseous origin, and the production of their salts. This process of rotting usually requires one or two months, and the warmer the weather the more rapid is the chemical decomposition.

When the manure is thoroughly rotten, it should be dried, which may be done upon the barn-floor, or in any other suitable manner. After being dried, it should be made fine enough for being sown in drills, by means of the common guano-attachment to grain-drills. The manure may be easily reduced to coarse powder by the trampling of horses, or by running it through a threshing-machine, or by other proper means.

The above-described process may also be applied to the finer portions of straw manure, to the scrapings of the barn-yard, and to many other materials.

I have submitted my improved fertilizer to a practical test, and I find its effect upon the crop about four-fold when compared with the same amount of manure from the same animals used in the ordinary way. My improved fertilizer may be mixed with bone-dust, plaster, lime, or other suitable fertilizer, and then used like guano, as above described.

I am aware that various manures, fish, and other substances, have been piled up and covered with earth, to rot, therefore I do not claim such process or treatment applied in any manner heretofore known, but confine my claims to the special method and product above described.

Having thus fully described my invention, what I claim, and desire to secure by Letters Patent of the United States, is—

1. The above-described process of damp-rotting manure, and then pulverizing the same, substantially in the manner and for the purposes set forth.

2. I also claim the new fertilizer, prepared by rotting, drying, and then pulverizing manure, substantially as described.

In testimony whereof, I have hereunto set my hand, in the presence of two subscribing witnesses.

JOSEPH W. BITNER.

Witnesses:
    EDM. F. BROWN,
    DANIEL BREED.